(12) United States Patent
Economaki

(10) Patent No.: US 6,247,240 B1
(45) Date of Patent: Jun. 19, 2001

(54) RULER SYSTEM

(75) Inventor: John J. Economaki, Portland, OR (US)

(73) Assignee: Bridge City Tool Works, Inc., Portland, OR (US)

( * ) Notice: Subject to any disclaimer, the term of this patent is extended or adjusted under 35 U.S.C. 154(b) by 0 days.

(21) Appl. No.: 09/303,846

(22) Filed: May 3, 1999

Related U.S. Application Data

(60) Provisional application No. 60/084,057, filed on May 4, 1998.

(51) Int. Cl.$^7$ .......................................... G01B 3/04
(52) U.S. Cl. ........................ 33/484; 33/27.03; 33/449
(58) Field of Search .................... 33/484, 27.01, 33/27.02, 27.03, 27.031, 27.032, 427, 448, 449, 452, 464, 483, 485, 486, 487, 489, 490, 491, 492, 493, 494

(56) References Cited

U.S. PATENT DOCUMENTS

| | | | | |
|---|---|---|---|---|
| D. 138,309 | * | 7/1944 | Aikins | 33/483 |
| 833,168 | * | 10/1906 | Keller | 33/485 |
| 1,213,781 | * | 1/1917 | Sparkes | 33/490 |
| 2,166,030 | * | 7/1939 | Waeltz | 33/490 |
| 2,313,920 | * | 3/1943 | Campbell | 33/484 |
| 2,332,568 | * | 10/1943 | Gauthier | 33/27.031 |
| 2,673,399 | * | 3/1954 | Reader | 33/485 |
| 3,325,903 | * | 6/1967 | Zurlinden | 33/27.031 |
| 5,479,719 | * | 1/1996 | Liu | 33/449 |
| 5,813,126 | * | 9/1998 | Dahl | 33/427 |

* cited by examiner

Primary Examiner—Christopher W. Fulton
(74) Attorney, Agent, or Firm—John S. Pratt; Kristin Johnson; Kilpatrick Stockton LLP

(57) ABSTRACT

A ruler system for measuring workpieces includes a multi-surfaced ruler with rules inscribed along the edges of several surfaces. The ruler contains grooves and T-slots in its surfaces that run along the length of the ruler. In addition, apertures are located in the end surfaces of the ruler. The T-slots and apertures allow several accessories to be attached to the ruler for additional functionality. The accessories include a wheel attachment for drawing parallel lines, storyboard indicators for repeated measurements, a hook rule for measuring from the end of a workpiece, and trammel points for drawing arcs and circles. Connectors may be placed in the grooves of the ruler to link together multiple rulers.

28 Claims, 3 Drawing Sheets

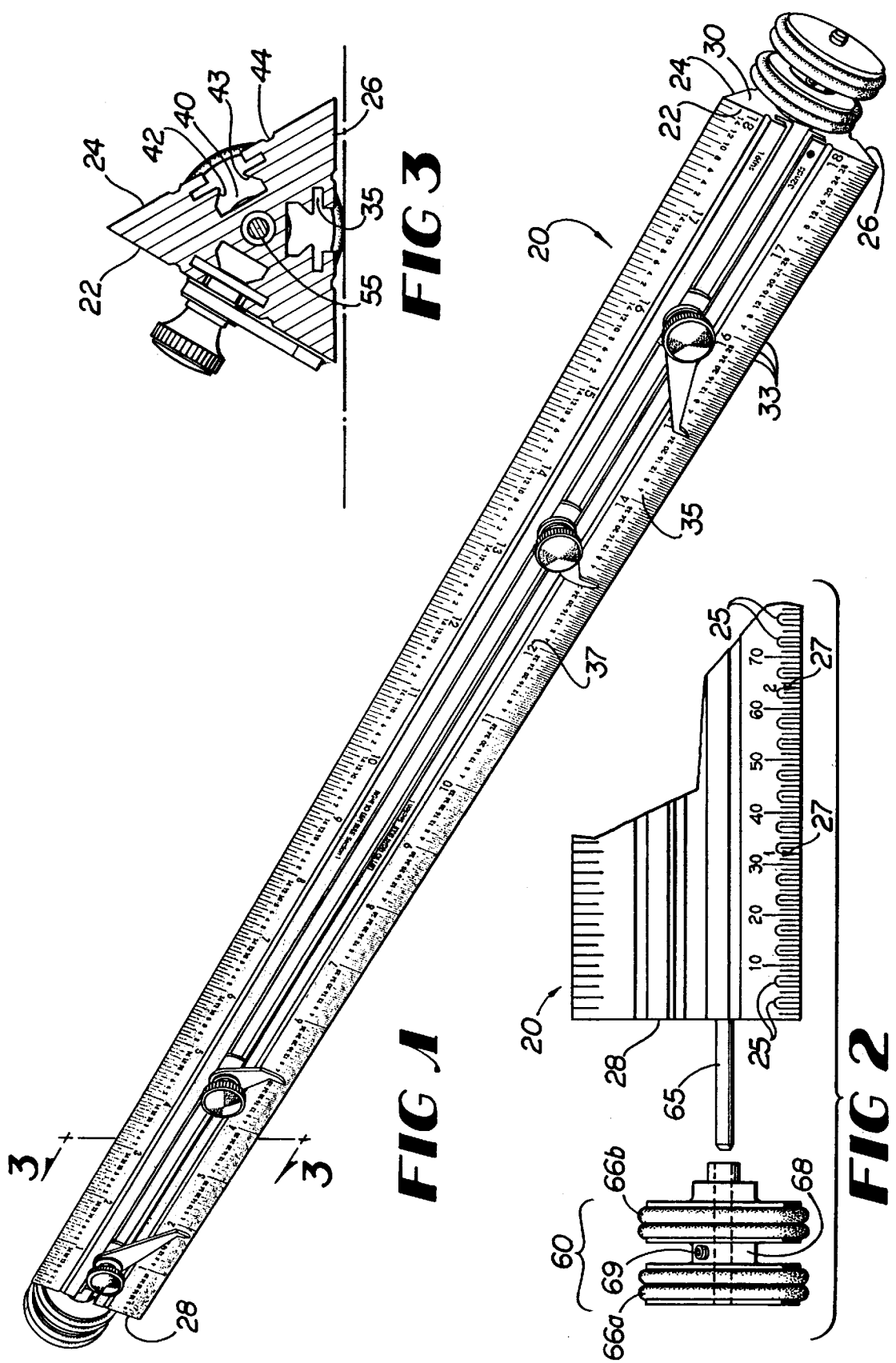

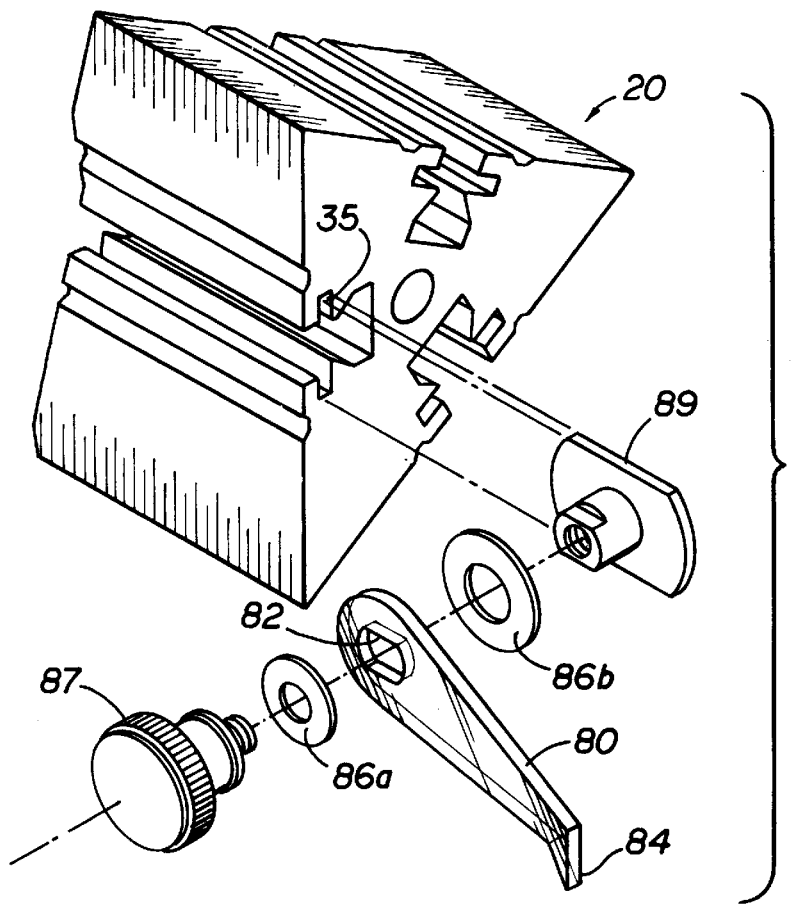
FIG 4
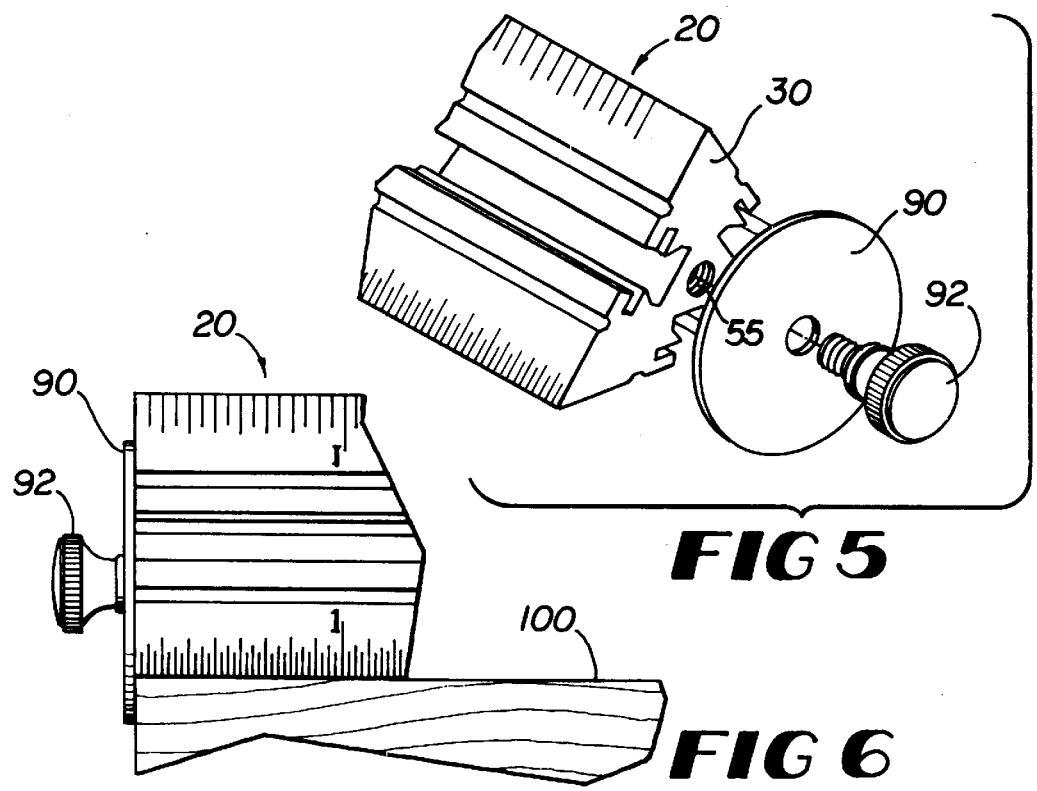
FIG 5
FIG 6

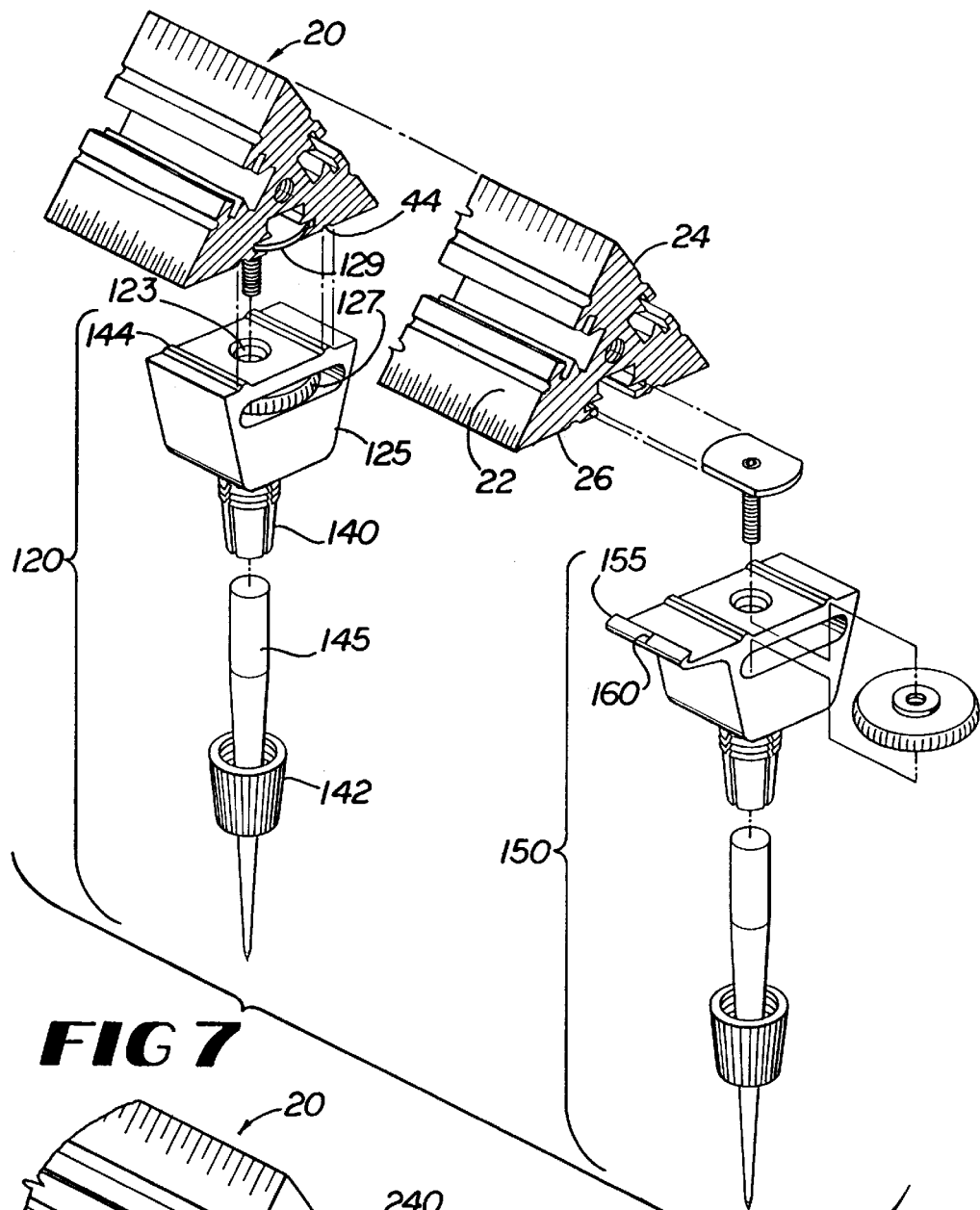
FIG 7
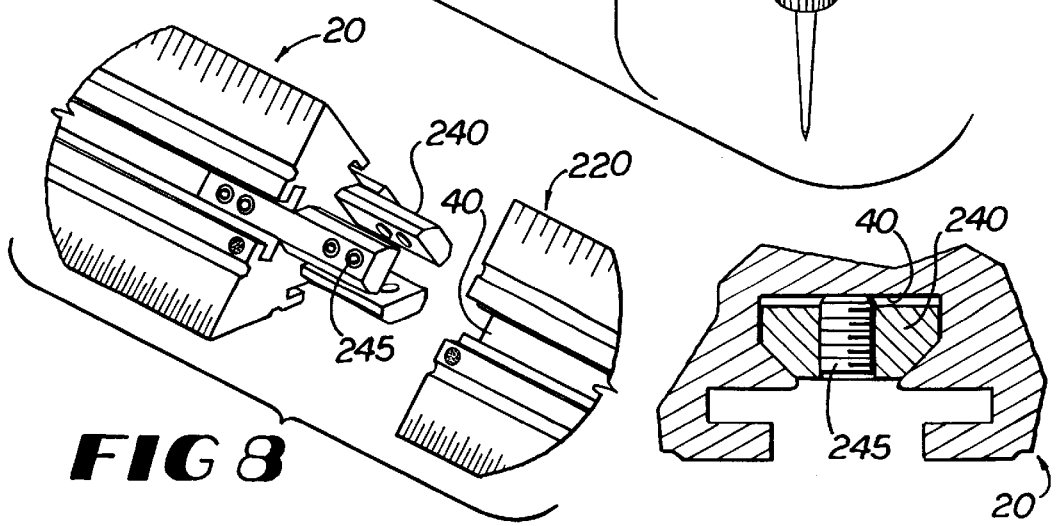
FIG 8
FIG 9

RULER SYSTEM

This application claim benefit to provisional Application 60/084,057 May 4, 1998.

BACKGROUND OF THE INVENTION

1. Field of the Invention

This invention is directed to a system for measuring workpieces and, more particularly, to an expandable ruler system that includes additional measuring and drafting functionality.

2. Background

"Measure twice, cut once," is a well-known axiom in woodworking. The usefulness and necessity of the phrase are derived from the difficulty associated with accurately measuring multiple workpieces during a project. In woodworking, accuracy is crucial. A wooden chair, for example, may require the precise cutting of several dozen parts. If one leg of the chair is shorter than another, the mistake will be quite noticeable. Rather than discovering the mistake during assembly, the prudent woodworker "measures twice" to ensure that the cut will be made at the correct location. He may then proceed to "cut once" and thereby avoid the wasteful procedure of cutting twice (or more).

Measurement errors also add up very quickly. A miter joint, one of the most commonly used joints, brings together two pieces of wood cut at respective 45 degree angles. When combined, the outer and inner edges of each piece form 90 degree angles to each other. Miter joints are often used in constructing picture frames and furniture edge-banding. If one piece of a four-sided picture frame is inaccurately measured, the resulting frame will have a gap at one or more of its joints. If all four pieces are improperly measured, the sum of the inaccuracies can be seen across each joint in the frame. Usually, the woodworker's only solution is to toss the entire frame and start over.

Measurement errors occur for a number of reasons. Many measurement errors may be associated with the measuring tools, themselves. Tape measures, the most common measuring tools, are well-known for their inaccuracy. Three tape measures from the same manufacturer and bearing the same model number are likely to provide three separate measurements differing by as much as 1/8 of an inch. The discrepancy between tape measures often lies in the steel hook at the end of the tape. The hook may be easily damaged by dropping the tape measure (a common occurrence) or by bending the hook during the measurement process. The tape measure also suffers from the stress applied to the tape by bending and turning the tape to obtain a measurement across several dimensions. Over time, the tape loses its form and depressions in the rule drawn across the tape cause inaccuracies in the tape measure.

Other measuring tools pose additional problems. A standard plastic or wood ruler can easily chip, thus resulting in the loss of measuring units. Moreover, the materials of such rulers are not sufficient to withstand the abuse that may be inflicted upon them in a workshop. Similarly, wooden folding rules are prone to inaccuracy due to mistreatment and the construction of the tool. Eventually, the folding mechanisms of the rules wear, thus making the rule both inaccurate and difficult to manage. Moreover, the hook at the end of the rule may be damaged like the hook on the tape measure.

One might assume that these problems might be avoided by using finer measurements (e.g., 1/64"). Unfortunately, most tape measures and folding rules do not include graduations finer than 1/16 of an inch. Fine measurements are usually found on more precise tools, such as combination squares and rules. But these tools typically are not long enough to measure boards longer than one foot. Two foot rules are usually considered too long to handle properly. Furthermore, the addition of finer graduations usually requires the elimination of metric units (i.e., one edge carries units in 1/4" and the opposite edge carries units in 1/32"). Alternatively, the woodworker can use multiple measuring devices having coarse units, fine units, and metric units. This can become quite unwieldy, however.

Some measurement inaccuracies occur due to human error in using the tools. The units on many tape measures and rules are very difficult to read under the heavy light commonly found in woodworking shops. Very often, the material used in constructing the tool causes a glare when the tool is viewed from certain angles. Thus, while the tool itself may be accurate, the woodworker reads it incorrectly leading to incorrect machining of the workpiece. Another common form of human error occurs when reading from the one inch mark. To get around the problems discussed above regarding banged-up hooks on tape measures, many woodworkers simply take the reading from the one inch mark. Unfortunately, they later forget to add an inch when taking the actual measurement. As a result, their workpieces end up one inch short.

Another problem associated with use of the English or Imperial measuring system is the need to remember at least three numbers when dealing with fractions of an inch. For example a measurement of 13 and 15/16ths inches may get miss-remembered or transposed as 15 and 13/16ths.

To eliminate many of the problems associated with measuring tools and human error, many woodworkers turn to "storyboards." A storyboard is a piece of wood that includes well-inscribed, commonly-used measurements. For example, if a project calls for twenty-four mortises (a "mortise" is a "hole" formed in or through the workpiece to receive a protruding "tenon" formed in another workpiece) of four inches in length, the storyboard will include one mark to indicate the beginning of the mortise and one mark to indicate the end of the mortise. The area between the two marks may be identified as "4 inch mortise" or a similar designation. The length between the two marks becomes the "standard" length for all mortises throughout the project. Thus, certain inaccuracies will not be of much concern since the measurement is uniform throughout the project. All of the mortises may have a length of 3 31/32", but this is preferable to mortises of varying length.

Storyboards have drawbacks, however. First, constructing storyboards can be time-consuming. Rather than immediately embarking upon a project, the woodworker must first construct one or more storyboards for the project. Second, multiple measurements along a single storyboard can become confusing. The only method for differentiating between measurements is a small title written within or beneath the measurement. Third, the wooden board used for the storyboard may be nicked or scuffed. Similarly, the board may accidentally contact a cutting machine midway through the project. A new storyboard would not contain the exact measurements of the previous storyboard. Also, storyboards may not be used for certain measurements that require the use of a combination square or similar item, such as accurately drawing lines.

The storyboard, therefore, is not the panacea for improper measurements. It has drawbacks and must be used in combination with other measuring tools. As discussed above, however, the more tools that are introduced into a project, the greater likelihood that measurement errors occur.

SUMMARY OF THE INVENTION

This invention is a ruler system that reduces the likelihood of measurement errors by including multiple measurement dimensions on a single multi-surfaced ruler. The ruler further includes grooves formed in each surface for accepting numerous accessories, including storyboard fingers and trammel heads. Several rulers may be combined using a device that slides within the grooves on each surface. This allows the system to measure lengths beyond the standard length of a single ruler. Apertures in end surfaces of each ruler accommodate the use of wheels for measuring parallel lines or a removable hook disc for measuring from the end of a board. Various parts may be interchanged quickly to allow the woodworker to take multiple accurate measurements without the use of several measuring tools.

In its most basic form, the invention is a ruler with multiple surfaces and several grooves for accommodating various accessories. The ruler is machined to provide a large degree of accuracy. Preferably, the ruler is triangular in cross-section. Each surface includes measurements etched along two of its edges. For example, one surface may have a 32nds right-to-left reading rule along one edge and a millimeters left-to-right reading rule along a second edge. Another surface, for example, may include a 16ths center-finding rule along one edge and a 32nds offset right-to-left rule along its second edge. The triangular cross-section allows the woodworker to read the rule as it lies before him. He need not lean over the rule as required for conventional rules and tape measures. In addition, the ruler surface is treated by blasting it with glass beads prior to anodizing to produce a uniform, low reflectivity surface to avoid the glare associated with most rules.

The ruler may be combined with one or more additional rulers to create a longer measuring system. One ruler may be connected to the next using devices that slide within the groove on each surface and are tightened using set screws. Each ruler includes a scale that continues the graduations of the previous ruler. The longer length of the ruler allows the system to be used in measuring large sheet goods that typically measure 4'×8'. A system containing three 18" rulers, for example, would allow the woodworker to measure along the entire four foot width of a plywood sheet.

Each ruler includes multiple grooves formed into each surface. The first groove accommodates the device for coupling multiple rulers. The device slides into the groove and receives set screws that allow the device to be secured tightly to the ruler. The second groove is a T-slot-type groove that accommodates various measuring accessories. One such accessory is an indicator finger. The indicator finger is a fluorescent pointer that attaches to a slider that slides within the groove and a screw used for tightening the pointer to the ruler. Multiple indicators may be used to create a storyboard for commonly used measurements. Unlike a conventional storyboard, however, the indicators may be moved when a particular measurement is no longer needed. Also, the fluorescent pointer on the indicator makes the storyboard measurements highly visible to the woodworker.

Trammel points are additional accessories that make this invention more versatile than standard measuring devices. Two trammel points are coupled to a ruler using the T-slots. Each trammel point includes a housing and a shaft that tapers to a point. The shaft and housing are attached to the ruler using a screw mechanism. When affixed, the user may drag one point along the workpiece to mark an arc or circle. The trammel points are indexed to one of the rules along the ruler such that accurate arcs and circles may be drawn. The points may be replaced with pencils to draw clearer lines on the workpiece.

The ruler accommodates additional accessories, such as a hook disc and a rolling ruler attachment. The hook disc attaches to an end of a ruler using a locking knob and a threaded aperture at an end of the ruler. The locking knob passes through the hook disc and into the aperture, thereby securing the hook disc. The woodworker may then take accurate measurements from the end of a workpiece. Similarly, wheels may be attached to the end of the ruler to create a rolling ruler. Axles screw into threaded apertures at opposite ends of the ruler. The wheels are placed along the axles. The wheels allow the woodworker to draw accurate parallel lines along the workpiece.

Accordingly, it is an object of this invention to provide a measurement device that is extremely accurate.

It is an additional object of this invention to provide a measurement device that includes multiple rules and scales.

It is yet another object of this invention to provide a measurement device that is extendible.

It is a further object of this invention to provide a measurement device that has a low glare surface that is easily read.

It is an additional object of this invention to provide a measurement device that performs the functions of several separate measurement devices.

It is yet another object of this invention to provide a measurement device that may be used as a versatile storyboard.

It is a further object of this invention to provide a measurement device that may be used as a trammel.

It is another object of this invention to provide a measurement device that may be used to measure distances from the end of a workpiece.

It is an additional object of this invention to provide a measurement device that can be used to draw parallel lines.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 1 is a perspective view of the ruler system according to this invention.

FIG. 2 is a front view of the ruler and wheel/axle combination of this invention.

FIG. 3 is an end view of the ruler and storyboard indicators of this invention.

FIG. 4 is an exploded perspective view of the ruler and storyboard indicators of this invention.

FIG. 5 is an exploded perspective view of the ruler and hook of this invention.

FIG. 6 is a front view of the ruler and hook of this invention when measuring from the end of a workpiece.

FIG. 7 is an exploded perspective view of the ruler and trammel points of this invention.

FIG. 8 is a perspective view of two rulers and coupling devices of this invention.

FIG. 9 is a cut-away view of the ruler and coupling devices of this invention.

DETAILED DESCRIPTION

Reference will now be made in detail to a preferred embodiment of the invention, examples of which are illustrated in the accompanying drawings. Wherever possible, the same reference numbers will be used throughout the drawings to refer to the same or like parts.

This invention is a ruler system for measuring items including, but not limited to, wood and metal workpieces. Hereafter, the term "workpiece" shall be used to describe any item to be measured by the ruler system of this invention.

FIG. 1 is a perspective view of the ruler system of this invention. In a basic form, the ruler system includes a multi-sided ruler 20. Preferably, the ruler 20 has a triangular shape with five distinct surfaces 22, 24, 26, 28, 30. The three longitudinal surfaces 22, 24, 26 intersect at 45 degree angles to form the equilateral triangular cross-section of the ruler 20. The ruler 20 is formed of hardened extruded aluminum.

Measurement rules are laser engraved along upper and lower edges of each longitudinal surface 22, 24, 26. Each rule includes a plurality of units (e.g., English or metric units) represented by straight or curved lines along the edge of the surface. Numerals indicate the number of units from the edge of the ruler 20 or from a particular unit along the rule. For example, in FIG. 1, the rule along the lower edge of surface 22 is a 32nds reading left-to-right rule. The rule includes a plurality of units 33 spaced 1/32 of an inch apart from each other. The large numerals 37 indicate the number of inches from the left-hand surface 28. The smaller units 35 indicate the number of basic units (1/32") from the left-most inch mark. Thus, the mark beneath the small numeral "4" to the right of the large numeral "14" would indicate a distance of 14 1/8" (i.e., 14 4/32"). Both English or Imperial units, as well as metric and other scales may used. In addition, center-finding rules may also be used. In a center-finding rule (English, metric, or otherwise), the "0" mark is located at the center of the ruler 20. The user may locate the center of a workpiece by finding identical marks to the left and right of the "0" that intersect the edges of the workpiece.

A metric scale graduated in millimeters may be enhanced by arcs between the even graduations, i.e., between 2 and 4 and between 6 and 8 millimeters to make quick identification of the even graduations easy. Such arcs 25 appear in FIG. 2. Additionally, an arrow or other indicator 27 of every 32 millimeter interval may be added and numbered to facilitate quick identification of those intervals, again or illustrated in FIG. 2.

One of the rules along the ruler 20 is an offset rule. The zero point of the offset rule begins a predetermined distance away from the end of the ruler 20. The offset rule allows measurements to be taken from a point other than the end of the ruler 20. Thus, errors that may occur due to damage to the end of the ruler may be eliminated. Normally, such measurements are taken from the one inch mark of a standard measurement device. The user is then required to subtract the "added inch" from the measurement. Since the offset rule of this invention begins at a point other than the end of the ruler 20, the additional calculation is not required.

A uniform, low reflectivity surface is achieved by subjecting the aluminum surface to a glass bead blast prior to anodizing. A two-tone finish may be achieved by masking portions to shield them from the glass bead treatment.

To accommodate the various accessories of the ruler system 20, each ruler includes a plurality of grooves and/or apertures along each surface. FIG. 3 is a cross-sectional view of the ruler 20 taken along the lines 3—3 of FIG. 1. As illustrated in FIG. 3, each longitudinal surface 22, 24, 26 includes a T-slot 35. The T-slot 35 is formed along the interior of each longitudinal surface and runs along the entire length of the surface. Each T-slot 35 is used to receive a base attached to an accessory of the ruler system. Each longitudinal surface 22, 24, 26 further includes a connecting groove 40 located beneath the T-slot. The connecting groove 40 also runs along the length of the surface. Opposite edges 42, 43 of the connecting groove 40 are beveled to receive beveled connectors 53 (see FIG. 8) used in connecting multiple rulers. The connecting groove 40 lies at a depth within the ruler that allows a connector 53 to sit therein without interfering with the movement of bases.

The ruler 20 may also include a plurality of indentations 44 formed along its length. The indentations 44 are designed to receive protrusions located along the bottom surface of certain accessories. As bases from these accessories glide along the T-slot 35 of a surface, the protrusions of the accessory engage the indentations 44 to further limit rotational movement of these accessories. In addition, the indentations 44 assist the user in determining the orientation of a particular accessory along the ruler 20. The user lines up the protrusions with the indentations 44 and slides the base into the T-slot 35.

A bore runs through the interior of the ruler 20. The bore terminates at apertures 55 located within opposing surfaces 28, 30. Each aperture 55 is tapped to receive a threaded coupler that couples the ruler to an accessory. One such accessory, a rolling ruler attachment 60, is illustrated in FIG. 2. The rolling ruler attachment 60 allows the ruler 20 to function as a rolling ruler. The attachment 60 includes two neoprene wheels 66a, 66b separated by a wheel center 68. The threaded coupler for the wheel attachment 60 is a cylindrical axle 65 that threads into the aperture 55 (not shown) formed in surface 28. The axle 65 engages a bore that runs through one wheel 66b into the wheel center 68. A locking set screw 69 that runs into an interior of the wheel center 68 may be tightened to engage the axle 65 and, thereby, fix the position of the axle 65. When rolling ruler attachments 60 and axles 65 are fixed on opposite ends of the ruler 20, the ruler 20 may be rolled into various parallel positions. The wheels 66a, 66b of the attachment 65 move in straight lines perpendicular to the longitudinal axis of the axle 65. The wheels 66a, 66b do not move laterally with respect to each other. Thus, parallel lines may be drawn with high accuracy.

Another accessory of the ruler system of this invention is the storyboard indicator. A storyboard is usually a board or workpiece marked with frequently-used measurements that ensures repeatability in measurements. In this invention, multiple indicators may be fixed along the ruler 20 to mark frequently-used measurements to accomplish the same goal of repeatability. FIG. 4 illustrates the attachment of an indicator 80 to the ruler 20. The indicator 80 is a plastic member containing an aperture 82 for affixing the indicator 80 to the ruler 20, and a tip 84 that points up or down to a particular unit along the ruler 80. For clearer visibility, the indicator 80 is preferably formed of a fluorescent-colored plastic. The indicator 80 is affixed to the ruler 20 by coupling the indicator 80 to a base 89 that slides in a T-slot 35 of the ruler 20. The base 89 is attached using washers 86a, 86b and a locking knob 87. The locking knob 87 passes through washers 86a, 86b, the aperture 82 in the indicator 80, and into the base 89. The base 89 then slides within the T-slot 35 until the tip 84 of the indicator 80 points to the desired measurement. The user may then tighten the locking knob 87 into the base 89 to fix the position of the indicator 80. Multiple indicators 80 are used to indicate particular measurements. The user may take a single measurement from these indicators or repeated measurements throughout an entire project or series of projects. In addition, measurements may be transferred from a workpiece to the ruler 20 by sliding the indicators 80 to the desired position.

The ruler 20 may also be used as a hook rule by attaching a hook disc 90, as shown in FIGS. 5 and 6. The hook disc 90 is attached to an end of the ruler 20 using a screw 92. The locking knob 92 engages the tapped aperture 55 along a surface 30 of the ruler 20. The tightened knob 92 presses the hook disc 90 flush against the surface 30. When fixed, the hook disc 90 catches an end of a workpiece 100 (FIG. 6). Measurements along the ruler 20 specify the distance between the point on the workpiece 100 directly beneath the measured unit and the end of the workpiece 100. The hook disc 90 can also be used with the storyboard indicators 80 (FIG. 4) to determine the distance between the indicator tip 84 and the end of the workpiece 100.

FIG. 7 is an exploded view of the ruler 20 and two trammel points 120, 150. Trammel points 120, 150 are used with the ruler 20 to allow the ruler system of this invention to function as a trammel beam. A trammel beam is a device used to draw arcs and circles. A pivot trammel and a scribing trammel extend from the trammel beam. The pivot trammel is inserted at the center of the arc or circle and the scribing trammel is used to draw the arc or circle. In this invention, one trammel point 120 functions as the pivot trammel and a second trammel point 150 functions as the scribing trammel.

Pivot trammel 120 includes a head 125 housing a locking knob 127 and a bore 123. The knob is generally cylindrical and is tapped to receive the threaded screw of a base 129. The base 129 engages the T-slot of the ruler 20. Protrusions 144 formed along an upper surface of the head 125 engage indentations 44 that run along the length of the ruler 20. The locking knob 127 may be turned to further engage the threaded base screw, thus tightening the base 125 to the ruler 20. A collet 140 is rigidly coupled to a lower surface of the base 125. The collet 140 is threaded along its outer surface and tapers downwardly. A pivot point 145 engages the collet 140 in a press fit. The pivot point 145 tapers from a generally cylindrical cross-section to a point. A decorative collar 142, such as a brass collar, is tapped along its inner surface to engage the threads of the collet 140. The collar 142 hides a portion of the collet 140 when the two items are fully engaged.

Scribing trammel 150 includes the same elements as trammel point 120, but further includes a lip 155 with an indicator or cursor 160. The lip 155 extends from the surface 26 beneath the ruler 20 (where the trammel point 150 is attached) around to an adjacent surface 22. The cursor 160 is used to index a point on the rule inscribed along the adjacent surface 22.

Preferably, the trammels 120, 150 are used with the offset rule so that the pivot point indexes the zero point of the rule. If used with another rule, a portion of the base of the trammel point may lie off the ruler 20, or the measurements must be taken from a nonzero position. To calibrate the trammels, a separate six inch ruler may be used. The user slides the scribing trammel 150 to a position along the offset rule, such as the four inch mark. The user then locks the scribing trammel 150 in position. The scribing trammel point is placed at a mark along the ruler. Next, the user moves the point of the pivot trammel 120 to a position along the ruler exactly four inches (or other appropriate measurement) away from the scribing trammel point along the ruler. The pivot point is then locked in place (this is the zero point of the rule). The point of either trammel 120, 150 may be replaced with a pencil or other writing instrument. To use the trammel, the user moves the scribing trammel 150 to the desired position along the rule. Once the position is obtained, the trammel 150 is locked into position. The user may then scribe the arc or circle by rotating the ruler 20 and the scribing trammel 150 about the fixed trammel 120.

The accessories of the ruler system described herein may be used on the single ruler 20 or with multiple rulers "linked" together. FIG. 8 illustrates the connection of one ruler 20 to a second ruler 220. Preferably, the second ruler is identical in shape to the first ruler. The second ruler 220, however, includes rules containing units that continue from the rules of the first ruler 20.

Rulers are connected using three beveled connectors 240. The connectors 240 are shaped to engage the connecting grooves 40 of the rulers 20, 220. FIG. 9 is a cross-sectional view illustrating the connector 240 engaging the connecting groove of the ruler 20. The connector 240 engages a connecting groove 40 in the first ruler 20 and the second ruler 220. The connectors are fixed to the respective rulers using a plurality of set screws 245 located within each connector. As shown, the set screw may be tightened to force the screw down against the bottom of the groove 40. As the screw 245 presses against the bottom of the groove 40, the beveled top of the connector 240 presses against the beveled portion of the groove 40. The process of placing a connector 240 within a groove 40 of the first ruler 20 and the second ruler 220 and tightening the set screws 245 is repeated for each connector 240 and each groove. Additional rulers may be added to the end of each ruler using the same process.

Each accessory of the ruler system may be used with a single ruler or with multiple rulers linked together. For example, the trammel points may be used with a single ruler to draw arcs or circles with radii less than the length of one ruler. Alternatively, the trammel points may be used with connected rulers to draw large arcs or circles. Similarly, storyboard indicators may be used to mark measurements less than the length of a single ruler or lengths spanning several connected rulers.

Having thus described a preferred embodiment of a ruler system, it should be apparent to those skilled in the art that certain advantages have been achieved. It should also be appreciated that various modifications, adaptations, and alternative embodiments thereof, including the use of additional grooves and/or T-slots, for example, may be made within the scope and spirit of the present invention. The invention is further defined by the following claims:

What is claimed is:

1. A ruler system comprising:
    a first ruler having a plurality of longitudinal surfaces and a plurality of end surfaces, wherein at least one connecting groove is formed along at least one of the longitudinal surfaces of the first ruler and at least one accessory groove is formed along at least one of the longitudinal surfaces of the first ruler; and
    at least one accessory coupled to at least one accessory groove formed in one of the longitudinal surfaces.

2. The ruler system, as recited in claim 1, further comprising:
    a first connector engaging at least one connecting groove formed in one of the longitudinal surfaces of the first ruler; and a second ruler having a plurality of longitudinal surfaces, wherein at least one connecting groove is formed along at least one of the longitudinal surfaces of the second ruler and at least one accessory groove is formed along at least one of the longitudinal surfaces of the second ruler; and wherein the first connector engages at least one connecting groove formed in one of the longitudinal surfaces of the second ruler.

3. The ruler system, as recited in claim 2, further comprising:

a second connector engaging at least one connecting groove formed in one of the longitudinal surfaces of the second ruler; and a third ruler having a plurality of longitudinal surfaces, wherein at least one connecting groove is formed along at least one of the longitudinal surfaces of the third ruler and at least one accessory groove is formed along at least one of the longitudinal surfaces of the third ruler; and wherein the second connector engages at least one connecting groove formed in one of the longitudinal surfaces of the third ruler.

4. The ruler system, as recited in claim 1, wherein the ruler has a triangular cross-section.

5. The ruler system, as recited in claim 4, further comprising:

a first rule inscribed along a first edge of a first longitudinal surface; and a second rule inscribed along a second edge of the first longitudinal surface.

6. The ruler system, as recited in claim 5, wherein the first rule is an offset rule.

7. The ruler system, as recited in claim 4, wherein each longitudinal surface includes a rule inscribed along an edge thereof and a different rule inscribed along a second edge thereof.

8. The ruler system, as recited in claim 4, further comprising:

an axle coupled to an aperture disposed in a first end surface of the ruler; and a wheel attachment having at least one wheel and an aperture for receiving the axle.

9. The ruler system, as recited in claim 8, wherein the wheel attachment includes a plurality of wheels separated at a predetermined distance.

10. The ruler system, as recited in claims 8, wherein the at least one wheel is neoprene.

11. The ruler system, as recited in claim 8, further comprising:

a second axle coupled to an aperture disposed in a second end surface opposite the first end surface; and a second wheel attachment having at least one wheel and an aperture for receiving the second axle.

12. The ruler system, as recited in claim 4, wherein the accessory is a storyboard indicator.

13. The ruler system, as recited in claim 4, further comprising a hook coupled to a first end surface of the ruler.

14. The ruler system, as recited in claim 13, wherein the hook has a cylindrical cross-section.

15. The ruler system, as recited in claim 4, wherein the accessory comprises:

a first trammel point coupled to a first longitudinal surface of the ruler; and a second trammel point coupled to the first longitudinal surface of the ruler.

16. The ruler system, as recited in claim 1, further comprising:

a scale on a low-glare surface.

17. The ruler system, as recited in claim 16, wherein the scale is graduated in millimeters and intervals of 32 millimeters are marked.

18. The ruler system, as recited in claim 16, wherein the scale is graduated in millimeters and arcs connect at least some of the adjacent evenly numbered millimeter intervals.

19. A ruler system comprising:

a ruler having a triangular cross-section formed by three adjacent surfaces;

an accessory slot formed in at least one of the three surfaces;

a connecting groove formed in at least one of the three surfaces; and an accessory coupled to the accessory slot in one of the three surfaces.

20. The ruler system, as recited in claim 19, wherein the ruler includes a rule inscribed along an edge of one of the three surfaces.

21. The ruler system, as recited in claim 20, wherein the ruler includes a second rule inscribed along a second edge of the one of the three surfaces.

22. The ruler system, as recited in claim 19, further comprising:

a connector engaging the connecting groove in one of the three surfaces; and a second ruler having a connecting groove formed along a surface thereof, the connector engaging the connecting groove of the second ruler.

23. The ruler system, as recited in claim 19, further comprising:

an axle coupled to an aperture disposed in a first end surface of the ruler; and a wheel attachment having at least one wheel and an aperture for receiving the axle.

24. The ruler system, as recited in claim 23, further comprising:

a second axle coupled to an aperture disposed in a second end surface opposite the first end surface; and a second wheel attachment having at least one wheel and an aperture for receiving the second axle.

25. The ruler system as recited in claim 19, further comprising a hook coupled to an end surface of the ruler.

26. The ruler system, as recited in claim 19, wherein the accessory is a storyboard indicator.

27. The ruler system; as recited in claim 19, wherein the accessory comprises:

a first trammel point slidably coupled to the slot; and a second trammel point slidably coupled to the slot.

28. A ruler system comprising:

a first ruler having a plurality of longitudinal surfaces, wherein the ruler has a triangular cross-section and each longitudinal surface comprises a plurality of grooves including a connecting groove and a T-slot formed along its length; and at least one accessory coupled to at least one groove formed in one of the longitudinal surfaces.

* * * * *